(12) United States Patent
Gotzmer et al.

(10) Patent No.: US 11,007,593 B1
(45) Date of Patent: May 18, 2021

(54) VULCAN FIRE TORCH

(71) Applicant: Department of the Navy, Indian Head, MD (US)

(72) Inventors: Carl Gotzmer, Accokeek, MD (US); Steven Kim, Crofton, MD (US); Mark Francis Cavolowsky, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 248 days.

(21) Appl. No.: 15/731,540

(22) Filed: Jun. 27, 2017

(51) Int. Cl.
*B23K 7/00* (2006.01)

(52) U.S. Cl.
CPC ...................... *B23K 7/00* (2013.01)

(58) Field of Classification Search
CPC ........................................................ B23K 7/00
See application file for complete search history.

(56) References Cited

U.S. PATENT DOCUMENTS

| | | |
|---|---|---|
| 4,645,899 A | 2/1987 | Bebber et al. |
| 7,576,296 B2 | 8/2009 | Fincke et al. |
| 8,810,122 B2 | 8/2014 | Foret |
| 8,904,749 B2 | 12/2014 | Foret |
| 9,259,795 B1 * | 2/2016 | Taylor ............... F41H 13/0043 |
| 2009/0261081 A1 | 10/2009 | Girold et al. |
| 2014/0227548 A1 | 8/2014 | Myrick |

* cited by examiner

*Primary Examiner* — Scott R Kastler
(74) *Attorney, Agent, or Firm* — Fredric J. Zimmerman

(57) ABSTRACT

A torch device includes a case connected to a first cap at a first end of the case, and a second cap at the second end. The first cap closes the first end. The second cap leaves an opening in the second end. A nozzle is connected to the second end. A first section is located in proximity of the nozzle inside the case. The first section contains a thermite material. A second section is located in proximity of the first section inside the case. The second section contains an ignitable composition. A third section is located in proximity of the second section inside the case. The third section contains the ignitable composition. A fourth section is located in proximity of the second section inside the case. The third and fourth sections are separated by an insulating tube. The fourth section contains an oxidizer.

17 Claims, 3 Drawing Sheets

VULCAN FIRE TORCH

GOVERNMENT INTEREST

The embodiments described herein may be manufactured, used, and/or licensed by or for the United States Government.

BACKGROUND

Technical Field

The embodiments herein generally relate to a torch, and more particularly to a handheld torch.

Description of the Related Art

Conventional torch systems are generally bulky and difficult to move around. Moreover, conventional torch systems typically require a separate oxygen source, which further consumes space and adds to the weight and volume of the overall torch system. It is therefore desirable to design torch systems that are light and spaciously compact, and are therefore highly portable.

SUMMARY

In view of the foregoing, an embodiment herein provides a torch device including an elongated case operatively connected to a first cap at a first end of the case, and a second cap at the second end of the case, where the first cap is configured to completely close the first end of the case, and where the second cap is configured to leave an opening in the second end of the case; a nozzle operatively connected to the second end of the case. A first section located in proximity of the nozzle inside the case, where the first section contains a thermite material. A second section located in proximity of the first section inside the case, where the second section contains an ignitable composition. A third section located in proximity of the second section inside the case, where the third section contains the ignitable composition; and a fourth section located in proximity of the second section inside the case, where the third section and the fourth section are separated by an insulating tube, and where the fourth section contains an oxidizer.

The thermite material may be ignitable. The ignitable composition in the second section may be configured to ignite upon the ignition of the thermite material. The ignitable composition in the third section together with the oxidizer in the fourth section may be configured to ignite upon the ignition of the ignitable composition in the second section. The ignitable composition may include an intermetallic material where the intermetallic material is a combustible fuel. The intermetallic material includes titanium and boron. Combustion of the intermetallic material may produce titanium diboride, and the titanium diboride may react with the oxidizer. The oxidizer may include lithium perchlorate. The nozzle may include graphite.

An embodiment herein provides torch device including a case comprising a first end and a second end; a first cap that completely closes the first end of the case; a second cap that partially closes the second end of the case and a nozzle operatively connected to the second end of the case; a plurality of sections located inside the case. The plurality of sections include a thermite material, an ignitable composition, and an oxidizer; and a tube separating some of the plurality of sections from one another.

The ignitable composition may include an intermetallic material where the intermetallic material is a combustible fuel. The intermetallic material includes titanium and boron. Combustion of the intermetallic material may produce titanium diboride, and the titanium diboride reacts with the oxidizer. The oxidizer may include lithium perchlorate. The nozzle may include graphite.

An embodiment herein provides a method for using a torch device, the method including providing a thermite material in a first section of the torch device; providing an ignitable composition in a second section of the torch device, where the second section is in proximity of the first section; providing the ignitable composition in a third section of the torch device, where the third section is in proximity of the second section; and providing an oxidizer in a fourth section of the torch device, The fourth section is in proximity of the second section and wherein the third section and the forth section are separated by an insulator tube; and igniting the thermite material. The ignitable composition in the second section ignites after the igniting of the thermite material, and the ignitable composition in the third section and the oxidizer in the fourth section ignite after the ignition of the ignitable composition in the second section.

The ignitable composition may include an intermetallic material, where the intermetallic material is a combustible fuel. The intermetallic material includes titanium and boron. The method may further include producing titanium diboride by combustion of the intermetallic material; and reacting the titanium diboride with the oxidizer. The oxidizer may include lithium perchlorate.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended Merely to facilitate an understanding of ways in which the embodiments herein may be practiced and to further enable those of skill in the art to practice the embodiments herein. Accordingly, the examples should not be construed as limiting the scope of the embodiments herein.

Figure 1:
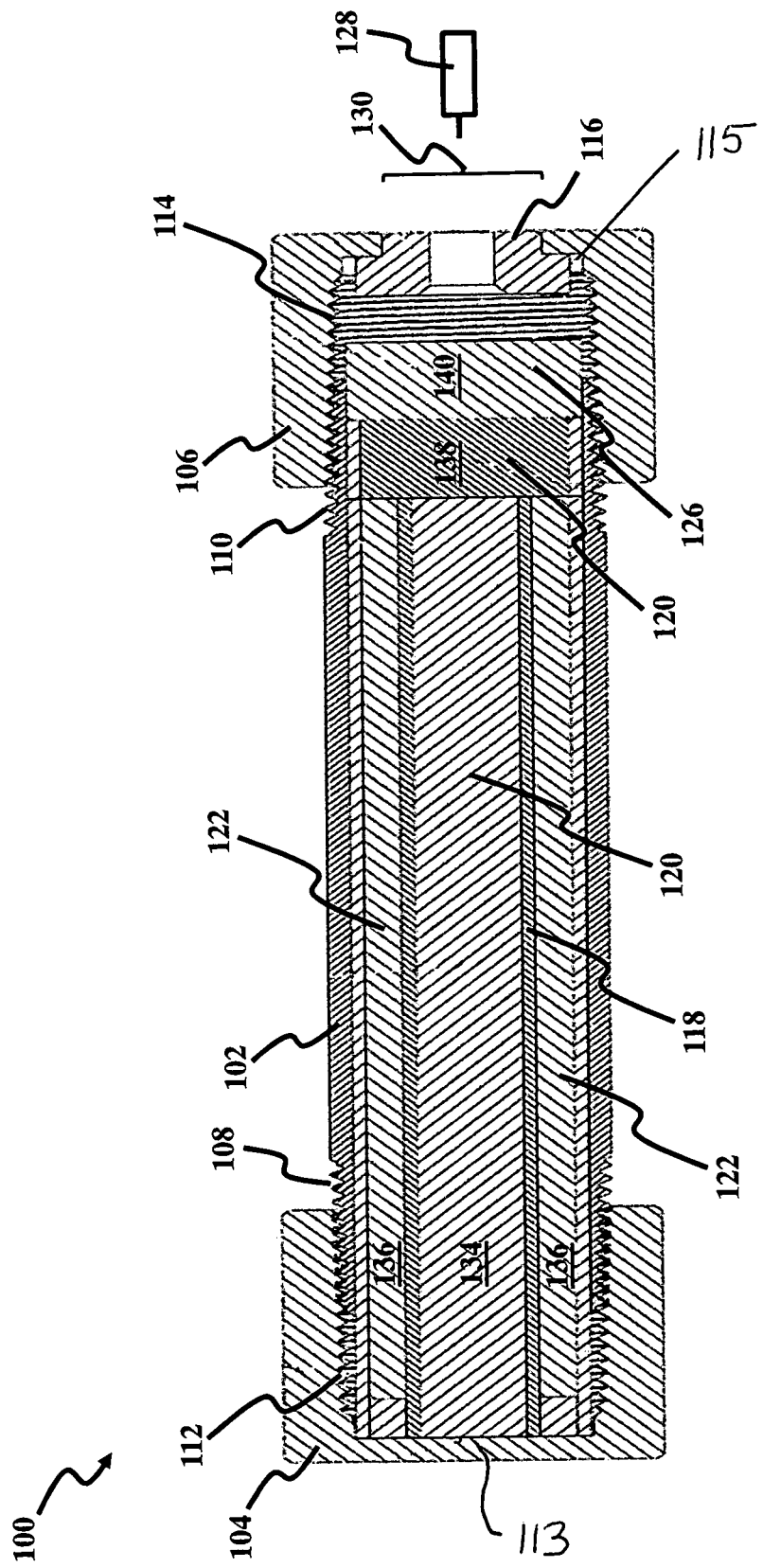
FIG. 1 is a cross-sectional view of a torch device according to an embodiment herein.
Figure 2:
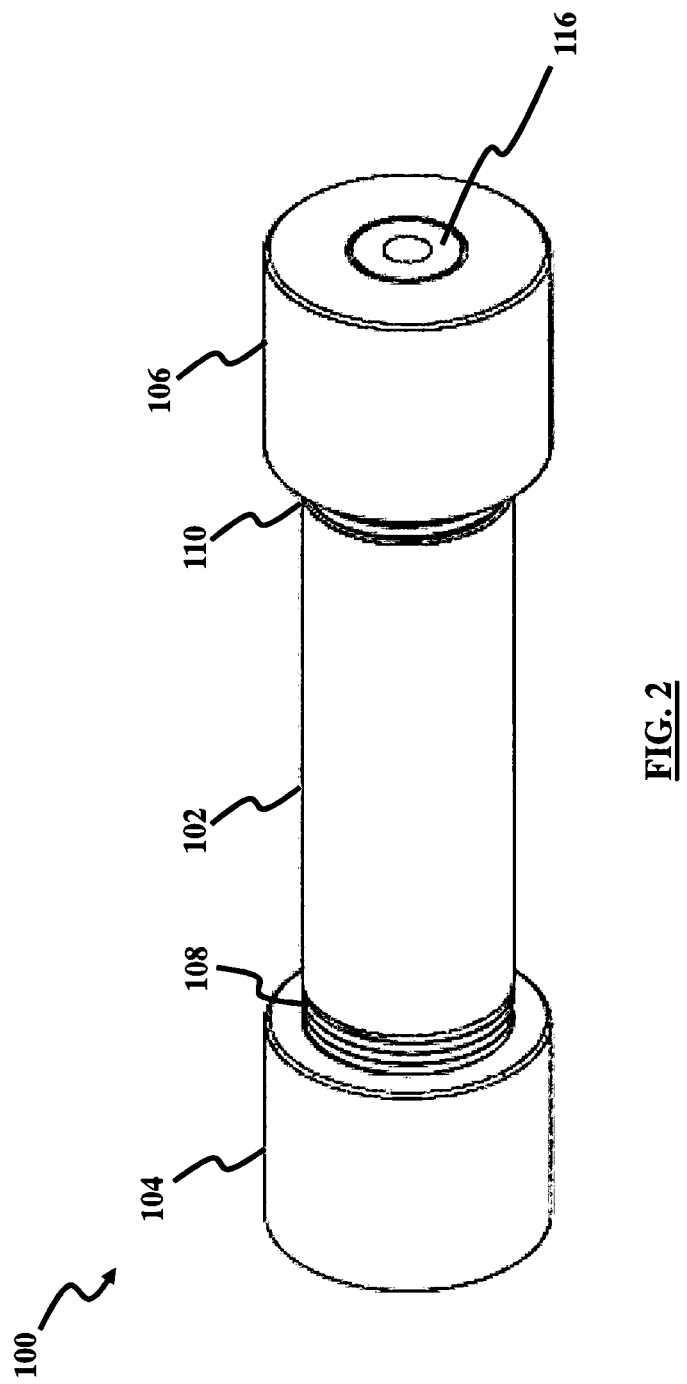
FIG. 2 is a perspective view of the torch device of FIG. 1 according to an embodiment herein.
Figure 3:
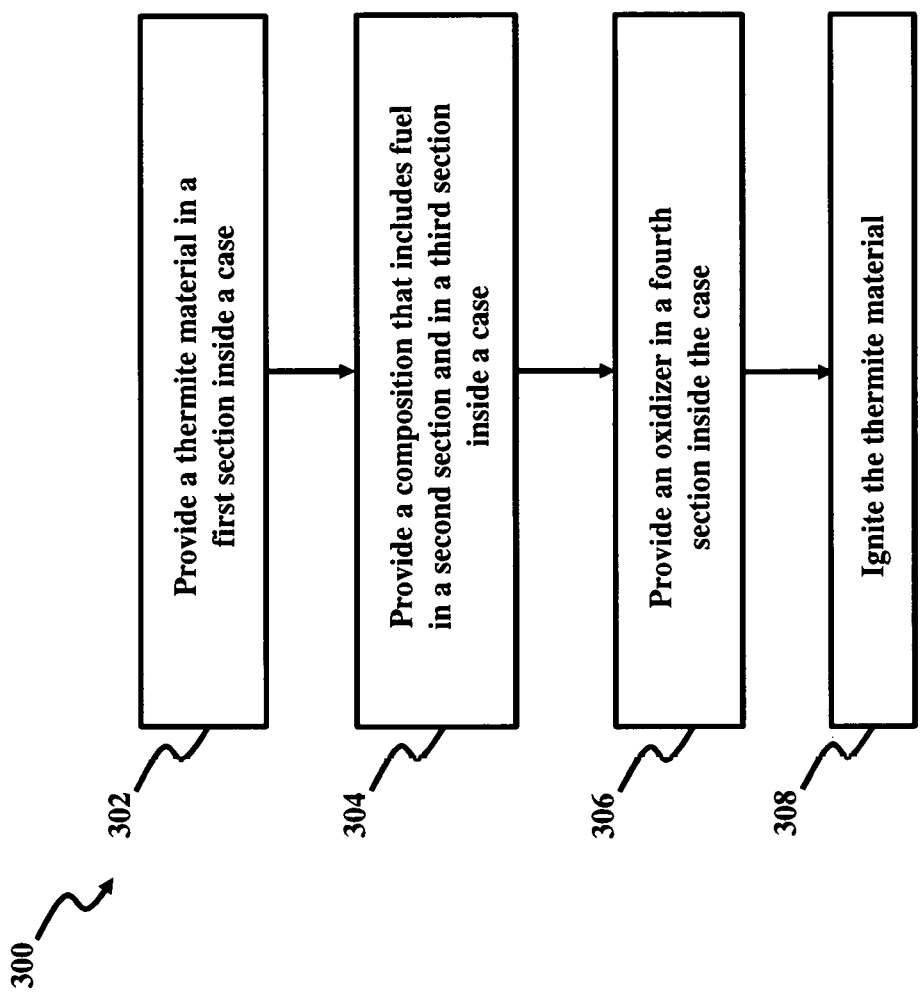
FIG. 3 is a flow diagram illustrating a method according to an embodiment herein.

The embodiments herein provide a handheld device for quickly and safely cutting through steel. Referring now to the drawings, and more particularly to FIGS. 1 through 3, where similar reference characters denote corresponding features consistently throughout the figures, there are shown exemplary embodiments.

FIG. 1 is a cross-sectional view of a torch device 100 according to an embodiment herein. The torch device 100 may include a case 102. In an exemplary embodiment, the case 102 is comprised of steel, and in an embodiment, the case 102 may be configured in a cylindrical shape, although other materials and configurations are possible. The case 102 may include threads 108, 110.

The torch device 100 may include a first cap 104 and a second cap 106. In an embodiment, the second cap 106 has an opening 130. In an embodiment, the caps 104, 106 are comprised of steel. The caps 104, 106 may include threads 112, 114, respectively, configured to engage threads 108, 110 of the case 102. In an exemplary embodiment as shown in FIG. 1, the first cap 104 completely closes or covers a first end 113 of the case 110 associated with threads 112, and the second cap 106 partially closes or covers the second end 115 of the case 110 associated with threads 114.

The torch device 100 may include a nozzle 116. The nozzle 116 may be operatively connected to the second end of the case 102. In an embodiment, the nozzle 116 comprises a nozzle made from graphite. In an exemplary embodiment, the nozzle 116 is connected to the case 102 using glue. In an exemplary embodiment, the glue is comprised of any of epoxy and cyanoacrylate.

The torch device 100 includes an insulator tube 118, which may be comprised of an insulation type material in a shape of a tube. The insulator tube 118 is configured to create sections 134, 136, 138, and 140 inside the case 102. Accordingly, the insulator tube 118 is situated intermediate section 134 and section 136 so that section 134 is located within the insulator tube 118. In an exemplary embodiment, the insulation type material of the insulator tube 118, may be either a ceramic or phenolic based material. In an embodiment, the torch device 100 includes a composition of matter 120 inside the section 134. In an exemplary embodiment, the composition of matter 120 includes an intermetallic material, which is a fuel. In an exemplary embodiment, the intermetallic material is composed of titanium and boron. In an exemplary embodiment, the compositional percentage of the titanium to percentage of boron is in a range of about 60% titanium/40% boron-about 70% titanium/30% boron. In an embodiment, the torch device 100 includes an oxidizer 122 in the section 136. Combustion of the intermetallic material produces titanium diboride, which reacts with the oxidizer 122.

In an embodiment, the composition of matter 120 is also provided in section 138. In an embodiment, the torch device 100 includes a thermite material 126 in section 140. In an exemplary embodiment, the thermite material 126 comprises any of Aluminum Iron Oxide II and Aluminum Iron Oxide III. In an embodiment, the intermetallic material in the composition of matter 120 is comprised of a composition of titanium and boron. In an embodiment, the oxidizer 122 comprises lithium perchlorate.

In an embodiment, the torch device 100 is initiated using a match 128. In an embodiment, the match 128 may be electric. The match 128 may ignite the thermite material 126 in section 140 of the torch device 100. In an embodiment, the thermite material 126 transitions into an approximately 15 g thermite charge after being ignited.

After the termite material 126 is ignited, the composition of matter 120 in section 138 is ignited. The composition of matter 120 does not need oxygen to ignite because it includes intermetallic material. In an embodiment, the composition of matter 120 may produce an (about) approximately 7,000° F. adiabatic flame temperature without the need for oxygen. The heat generated by the ignition of the composition of matter 120 causes the rest of the composition of matter 120 and its combustion product (titanium diboride) in section 134 to react with the oxidizer 122 in section 136 and generate a second stage of ignition. The thermal energy generated by the torch device 100 is highly increased when the ignition is boosted by the presence of the oxidizer 122 in the second stage of ignition. In an exemplary embodiment, the thermal energy is boosted by about five hundred percent in the second stage of ignition. The oxidizer 122 further produces a gas flow from the nozzle 116. The gas flow makes the torch device 100 effective for cutting through target metal materials, such as steel, by ablating or eroding the target material and pushing away the melted target slag.

FIG. 2, with reference to FIG. 1, is a perspective view of the torch device 100 according to an embodiment herein. As shown in this view, the torch device 100 includes the case 102, the threads 108 110, the caps 104, 106, and the nozzle 116. In an embodiment, the torch device 100 is portable due to its compact size. In an embodiment, the case 102 is about six inches long and has about one inch diameter, although other configurations are possible. The torch device 100, unlike traditional gas torches, does not require separate tanks of gas fuel and oxygen. The heavy tanks of gas fuel and oxygen in the traditional torch systems impede portability. The torch device 100 overcomes this problem of the traditional torch systems by combining the oxidizer 122 and the fuel of the composition of matter 120 into one portable system. Therefore, the torch device 100 described herein combines precision cutting and portability.

FIG. 3, with reference to FIGS. 1 and 2, is flow diagram illustrating a method 300 according to an embodiment herein. At step 302, the method 300 provides a thermite material 126 in section 140 of the torch device 100. At step 304, the method 300 provides a composition 120 in sections 134, 138 of the torch device 100. At step 306, the method 300 provides the oxidizer 122 in section 136 of the torch device 100. At step 300, the method 300 initiates the thermite material 126 in section 140 using the match 128.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of exemplary embodiments, those skilled in the art will recognize that the embodiments herein may be practiced with modification within the spirit and scope of the appended claims.

What is claimed is:

1. A torch device, comprising:
   an elongated case being operatively connected to a first cap at a first end of the case, and a second cap at the second end of said case, wherein said first cap is configured to completely close said first end of said case, and wherein said second cap is configured to leave an opening in said second end of said case;

a nozzle operatively being connected to said second end of said case;

a first section being located adjacent said nozzle inside said case, wherein said first section contains a thermite material;

an insulator tube being located within said elongated case;

a second section being located adjacent said first section inside said case and being situated intermediate the first section and the insulator tube, and wherein said second section contains an ignitable composition;

a third section being situated intermediate said second section inside said case and the first cap, wherein the third section is internal and surrounded by the insulating tube, and wherein said third section contains said ignitable composition; and a fourth section being situated intermediate said second section inside said case and the first cap, wherein said third section and said fourth section are separated by an insulating tube, wherein said fourth section contains an oxidizer, and wherein said oxidizer comprises lithium perchlorate.

2. The device of claim 1, wherein said thermite material is an ignitable thermite material selected from one of Aluminum Iron Oxide II and Aluminum Iron Oxide III.

3. The device of claim 2, wherein said ignitable composition in said second section is configured to ignite upon the ignition of said thermite material.

4. The device of claim 2, wherein said ignitable composition in said second section is configured to ignite upon the ignition of said thermite material, and wherein said ignitable composition in said third section together with said oxidizer in said fourth section are configured to ignite upon the ignition of said ignitable composition in said second section.

5. The device of claim 1, wherein said ignitable composition comprises an intermetallic material, and wherein said intermetallic material is a combustible fuel.

6. The device of claim 5, wherein said intermetallic material is comprised of titanium and boron.

7. The device of claim 5, wherein combustion of said intermetallic material produces titanium diboride, and wherein said titanium diboride reacts with said oxidizer.

8. The device of claim 1, wherein said nozzle comprises graphite.

9. A torch device, comprising:

a case comprising a first end and a second end;

a first cap being situated adjacent and operatively connected to the first end for completely closing said first end of said case;

a second cap being situated adjacent and operatively connected to the second end for partially closing said second end of said case;

a nozzle being operatively connected to said second end of said case;

a plurality of sections being located inside said case, wherein said plurality of sections comprise a thermite material, an ignitable composition, and an oxidizer; and a tube separating some of said plurality of sections from one another, wherein said oxidizer comprises lithium perchlorate.

10. The device of claim 9, wherein said ignitable composition comprises an intermetallic material, and wherein said intermetallic material is a combustible fuel.

11. The device of claim 10, wherein said intermetallic material is comprised of titanium and boron.

12. The device of claim 10, wherein combustion of said intermetallic material produces titanium diboride, and wherein said titanium diboride reacts with said oxidizer.

13. The device of claim 9, wherein said nozzle is comprised of graphite.

14. A method for using a torch device, comprising:

providing a thermite material in a first section of said torch device;

providing an insulator tube within an elongated case of the torch device;

providing an ignitable composition in a second section of said torch device, wherein said second section is adjacent said first section and being situated intermediate the first section and the insulator tube;

providing said ignitable composition in a third section of said torch device, wherein said third section is situated intermediate said second section and a first end of the torch device, and wherein the third section is surrounded by the insulator tube;

providing an oxidizer in a fourth section of said torch device, wherein said fourth section is situated intermediate said second section and the first end of the torch device, and wherein said third section and said forth section are separated by an insulator tube; and igniting said thermite material, wherein said ignitable composition in said second section ignites after said igniting of said thermite material, wherein said ignitable composition in said third section and said oxidizer in said fourth section ignite after the ignition of said ignitable composition in said second section, and wherein said oxidizer comprises lithium perchlorate.

15. The method of claim 14, wherein said ignitable composition comprises an intermetallic material, and wherein said intermetallic material is a combustible fuel.

16. The method of claim 15, wherein said intermetallic material is comprised of titanium and boron.

17. The method of claim 15, further comprising producing titanium diboride by combustion of said intermetallic material; and reacting said titanium diboride with said oxidizer.

* * * * *